(12) United States Patent
Wang et al.

(10) Patent No.: US 11,714,816 B2
(45) Date of Patent: Aug. 1, 2023

(54) INFORMATION SEARCH METHOD AND APPARATUS, DEVICE AND STORAGE MEDIUM

(71) Applicant: BEIJING BAIDU NETCOM SCIENCE AND TECHNOLOGY CO., LTD., Beijing (CN)

(72) Inventors: Shijun Wang, Beijing (CN); Jingjing An, Beijing (CN); Shuwei Lu, Beijing (CN); Shuai Zhu, Beijing (CN); Chao Wang, Beijing (CN); Shouke Qin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 248 days.

(21) Appl. No.: 17/209,981

(22) Filed: Mar. 23, 2021

(65) Prior Publication Data
US 2021/0216561 A1    Jul. 15, 2021

(30) Foreign Application Priority Data
Aug. 21, 2020    (CN) .......................... 202010851832.X

(51) Int. Cl.
*G06F 17/00*    (2019.01)
*G06F 7/00*    (2006.01)
(Continued)

(52) U.S. Cl.
CPC .... *G06F 16/24578* (2019.01); *G06F 16/2246* (2019.01); *G06F 16/248* (2019.01)

(58) Field of Classification Search
CPC ........... G06F 16/24578; G06F 16/2246; G06F 16/248
(Continued)

(56) References Cited

U.S. PATENT DOCUMENTS

| 9,009,177 B2* | 4/2015 | Zheng ................... G06F 16/444 |
| | | 707/758 |
| 2007/0112792 A1* | 5/2007 | Majumder .......... G06F 16/9535 |
| | | 707/999.1 |

(Continued)

FOREIGN PATENT DOCUMENTS

| CN | 110046276 A | 7/2019 |
| CN | 110880124 A | 3/2020 |

(Continued)

OTHER PUBLICATIONS

Cheng E., et al., "Using Implicit Relevane Feedback to Advance Web Image Search," Proceedings / 2006 IEEE International Conference on Multimedia and Expo ICME2006, Jul. 9-12, 2006, Hilton, Toronto, Ontario, Canada, IEEE Service Center, Piscataway, NJ, XP032965060, DOI: 10.1109/ICME.2006.262895, ISBN: 978-1-4244-0366-0, pp. 1773-1776.

(Continued)

*Primary Examiner* — Pavan Mamillapalli
(74) *Attorney, Agent, or Firm* — Patterson Thuente, P.A.

(57) ABSTRACT

An information search method and apparatus, a device and a storage medium, relating to fields of intelligent search, intelligent recommendation, deep learning and the like. A specific implementation includes: determining feature information of a target user; acquiring at least one candidate search path to determine candidate search results in a database; determining a matching degree between the feature information of the target user and the at least one candidate search path using a matching model, and determining a target search path from the candidate search paths according to the matching degree; and determining a target search result matched with the target user using the target search path.

18 Claims, 7 Drawing Sheets

(51) Int. Cl.
*G06F 16/2457* (2019.01)
*G06F 16/22* (2019.01)
*G06F 16/248* (2019.01)

(58) Field of Classification Search
USPC .......................................................... 707/730
See application file for complete search history.

(56) References Cited

U.S. PATENT DOCUMENTS

| | | | | |
|---|---|---|---|---|
| 2008/0027929 | A1* | 1/2008 | Rice ................. | G06F 16/90335 |
| | | | | 707/E17.14 |
| 2012/0330939 | A1* | 12/2012 | McCloskey ............ | G06Q 30/02 |
| | | | | 707/723 |
| 2013/0290340 | A1 | 10/2013 | Suermondt et al. | |
| 2014/0025660 | A1* | 1/2014 | Mohammed ....... | G06Q 30/0241 |
| | | | | 707/722 |
| 2014/0226904 | A1* | 8/2014 | Kimura ................ | G06V 30/153 |
| | | | | 382/185 |
| 2014/0236943 | A1* | 8/2014 | Li ....................... | G06F 16/3344 |
| | | | | 707/736 |
| 2014/0280214 | A1* | 9/2014 | Han .................. | G06F 16/24575 |
| | | | | 707/748 |

FOREIGN PATENT DOCUMENTS

| | | |
|---|---|---|
| JP | 2008070959 A | 3/2008 |
| JP | 2012238114 A | 12/2012 |
| JP | 2019053682 A | 4/2019 |
| JP | 2019133565 A | 8/2019 |
| JP | 2019168787 A | 10/2019 |
| JP | 2019219731 A | 12/2019 |
| KR | 20190128246 | 11/2019 |

OTHER PUBLICATIONS

Chu W., et al., "Personalized Recommendation on Dynamic Content Using Predictive Bilinear Models," www 2009, Apr. 20, 2009, XP055293924, Madrid, Spain, Retrieved from the Internet: URL:http://www.wwwconference.orgjwww2009/roceedingsjpdf/p691.pdf [retrieved on Aug. 5, 2016], pp. 691-700.
Extended European Search Report for Application No. 21164240.0, dated Sep. 7, 2021, 10 pages.
Zhu H., et al., "Learning Tree-based Deep Model for Recommender Systems," arxiv.org, Cornell University Library, 201 Olin Library Cornell University Ithaca, NY 14853, Jan. 8, 2018, XP081424352, DOI: 10.1145/3219819.3219826, 10 pages.
Notice of Reasons for Refusal for Japanese Application No. 2021-084776, dated Jun. 28, 2022, 6 pages.
Office Action corresponding to KR application No. 10-2021-0038452 dated Jan. 4, 2023.

* cited by examiner

INFORMATION SEARCH METHOD AND APPARATUS, DEVICE AND STORAGE MEDIUM

CROSS-REFERENCE TO RELATED APPLICATION

This application claims priority to Chinese patent application No. 202010851832.X, filed on Aug. 21, 2020, which is hereby incorporated by reference in its entirety.

TECHNICAL FIELD

The present application relates to a field of computer technologies, and particularly to fields of intelligent search, intelligent recommendation, deep learning and the like.

BACKGROUND

An online personalized recommendation system can recommend personalized content according to preferences of a target user, and needs to recall about ten pieces of content from a content library having millions of pieces of content within about 500 milliseconds and display them to the target user.

SUMMARY

The present application provides an information search method and apparatus, a device and a storage medium.

According to an aspect of the present application, there is provided an information search method, including:
 determining feature information of a target user;
 acquiring at least one candidate search path to determine candidate search results in a database;
 determining a matching degree between the feature information of the target user and the at least one candidate search path using a matching model, and determining a target search path from the at least one candidate search path according to the matching degree; and
 determining a target search result matched with the target user using the target search path, the target search result being recommended to the target user.

According to another aspect of the present application, there is provided an information search apparatus, including:
 a target user feature information determination module configured to determine feature information of a target user;
 a candidate search paths acquisition module configured to acquire at least one candidate search path to determine candidate search results in a database;
 a target search path determination module configured to determine a matching degree between the feature information of the target user and the at least one candidate search path using a matching model, and determine a target search path from the at least one candidate search path according to the matching degree; and
 a target search result determination module configured to determine a target search result matched with the target user using the target search path.

According to a third aspect of the present application, there is provided an electronic device, including:
 at least one processor; and
 a memory communicatively connected to the at least one processor; wherein,
 the memory stores instructions, which are executable by the at least one processor to enable the at least one processor to perform the method provided by any of the embodiments of the present application.

According to a fourth aspect of the present application, there is provided a non-transitory computer-readable storage medium, which stores computer instructions for enabling a computer to perform the method provided by any of the embodiments of the present application.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The accompanying drawings are provided for better understanding of the solution, rather than limiting the present application. In which.

DETAILED DESCRIPTION OF THE DRAWINGS

Exemplary embodiments of the present application are described below with reference to the accompanying drawings, including various details of the embodiments of the present application to facilitate the understanding, and they should be considered as merely exemplary. Thus, it should be realized by those of ordinary skill in the art that various changes and modifications can be made to the embodiments described here without departing from the scope and spirit of the present application. Also, for the sake of clarity and conciseness, the contents of well-known functions and structures are omitted in the following description.

An online personalized recommendation system can recommend personalized content according to preferences of a target user, and needs to recall about ten pieces of content from a content library having millions of pieces of content within about 500 milliseconds and display them to the target user.

Related technologies rely on historical records of the target user to determine search content in a database, which has the defects of insufficient precision and generalization capability.

Figure 1:
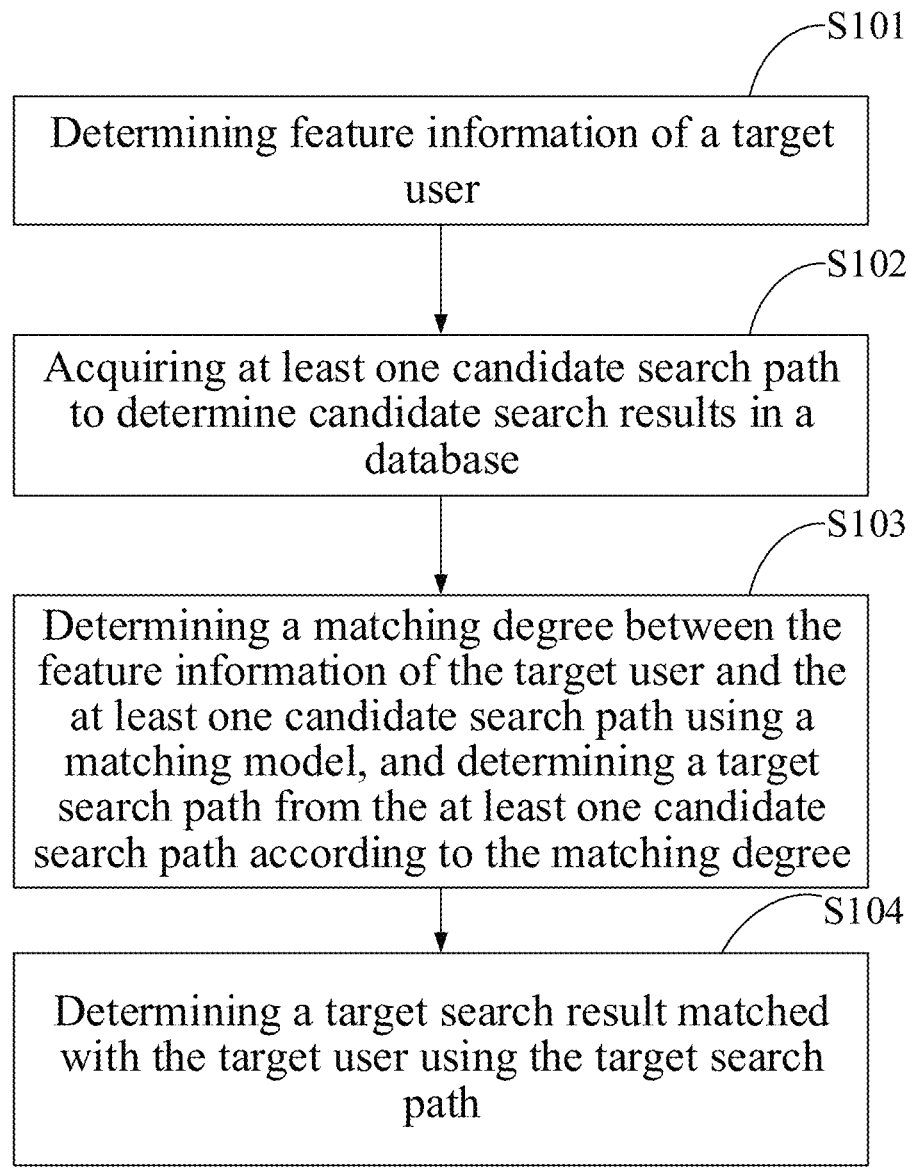
FIG. 1 is a flowchart of an information search method according to the present application.

As shown in FIG. 1, the present application provides an information search method, which may include:

S101: determining feature information of a target user;

S102: acquiring at least one candidate search path to determine candidate search results in a database;

S103: determining a matching degree between the feature information of the target user and the at least one candidate search path using a matching model, and determining a target search path from the at least one candidate search path according to the matching degree; and S104: determining a target search result matched with the target user using the target search path, the target search result being recommended to the target user.

In the technology according to the present application, a plurality of candidate paths of the target search result are planned using the search network. Next, the plurality of candidate search paths are analyzed and judged using the matching model, and finally, the selected target search path is adopted to obtain the target search result with a highest correlation with the target user using the selected target search path. Since the search network and the matching model are adopted, the candidate search paths can be filtered, thereby ensuring both the search generalization capability and the search accuracy.

The above method can be implemented by an application program of an intelligent device. For example, after the target user logs in the present application program, the database may be automatically searched according to the feature of the target user, so as to determine a content that the target user is interested in as the target search result, and display it to the target user.

The feature information of the target user may include an age and a gender of the target user, and browsing habits extracted from browsing logs of the target user. For example, the feature information of target user A may include: a 25-year-old male who often browses sports videos, and graphics and text information of movie information. The feature information of target user B includes: a 40-year-old male who browses financial news every day.

The sports videos, the graphics and text information of the movie information, and the financial news may be stored in the database. A plurality of candidate search paths may construct a search network. That is, the search network may include a plurality of candidate search paths, each of which can finally retrieve at least one candidate search result. The search network may search the database, thereby ensuring a search coverage rate to reach 100%.

The search network may include at least one tree search structure. Each branch of the tree search structure may be corresponding to a candidate search path. A root node, a child node and a leaf node of each candidate search path in the search network may be multistage search results in different levels of abstraction. For example, the root node may be a sports event, the child node may be a football, and the leaf node may be a Chinese football league.

In addition, the search network may also be an independent individual, such as a sports event, a Chinese football league, etc.

In an example where the search network is a tree search structure, the matching model may analyze the nodes in the tree search structure to obtain matching scores of the nodes and the target user. The nodes are ranked according to the matching scores, the target search path may be determined from the candidate search paths, and the target search result matched with the target user may be determined according to the target search path.

Figure 2:
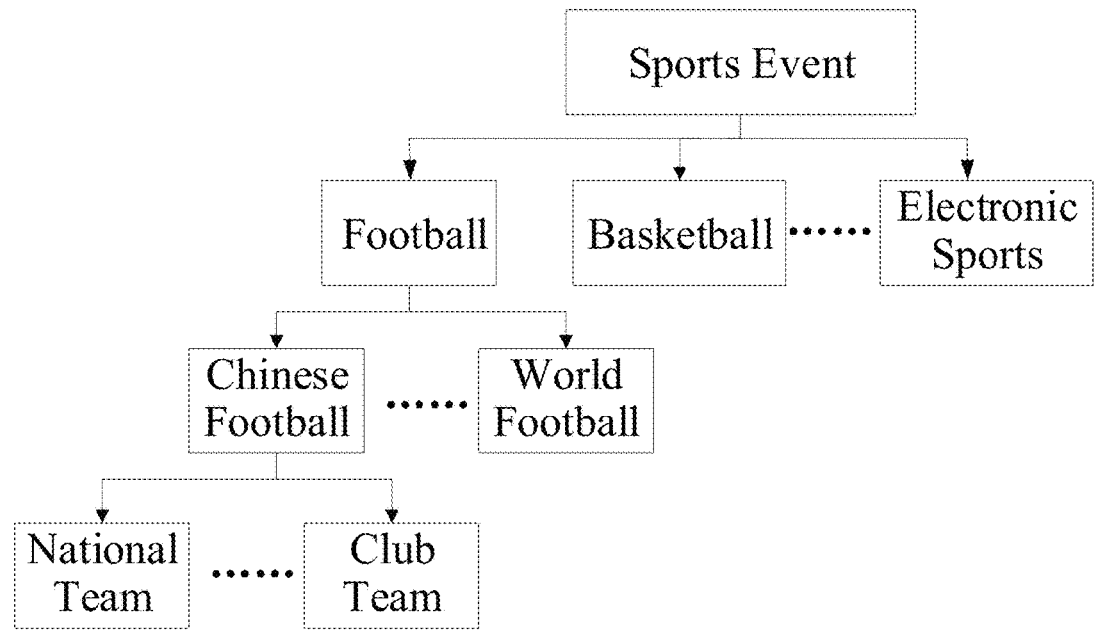
FIG. 2 is a schematic diagram of a search network according to the present application.

Referring to the example as shown in FIG. 2, four hierarchies are included, and the matching model scores the first hierarchy of child nodes. In a case where the matching score of a football node is the highest, the football node is determined as the candidate search path, and other search paths are ignored. Next, the matching model scores the second hierarchy of child nodes subsequent to the football node, and so on in a similar fashion, and finally determines two leaf nodes, i.e., an adult national team and a club team, as the target search results.

The matching model may be trained based on the operation histories of the target user for different target search results. For example, a target search result clicked by the target user may be taken as a positive sample, while a target search result not clicked by the target user and other search results not displayed to the target user may be taken as negative samples. The matching model is trained with a label, which is a viewing duration or a viewing proportion of the target user.

Through the above solution, a plurality of candidate paths of the target search result are planned using the search network. Next, the plurality of candidate search paths are analyzed and judged using the matching model, and finally, the selected target search path is adopted to obtain the target search result that matches preferences of the target user. Since the search network and the matching model are adopted, the candidate search paths can be filtered, thereby ensuring both the search generalization capability and the search accuracy.

In one embodiment, the at least one candidate search path forms at least one tree search structure, each of the at least one tree search structure includes a plurality of nodes;

each of the at least one candidate search path includes a path from a root node to a leaf node in the tree search structure.

Referring to FIG. 2, the search network may be a Beam search network. In the present embodiment, sports are taken as the root node with the highest level of abstraction in the beam search network. Football, basketball, electronic sports, etc. are taken as child nodes with the second highest level of abstraction, and so on. That is, the root node, the child node and the leaf node may be corresponding to the search results with different levels of abstraction, respectively.

In actual scenarios, the nodes with different levels of abstraction (the root node, the child node and the leaf node) may be represented in the form of feature embedding.

In the example as shown in FIG. 2, the sports events, the entertainment, etc. are taken as the root nodes, but the actual scenarios are not limited thereto. In the actual scenarios, the Beam search network may be constructed according to the type of the search result. For example, there may be a plurality of candidate search networks, such as a graphic and text search result, a video search result and a short video search result, wherein the short video search result may include short videos made by netizens using devices such as mobile phones and/or short videos in a graphic interchange format (GIF).

Figure 3:
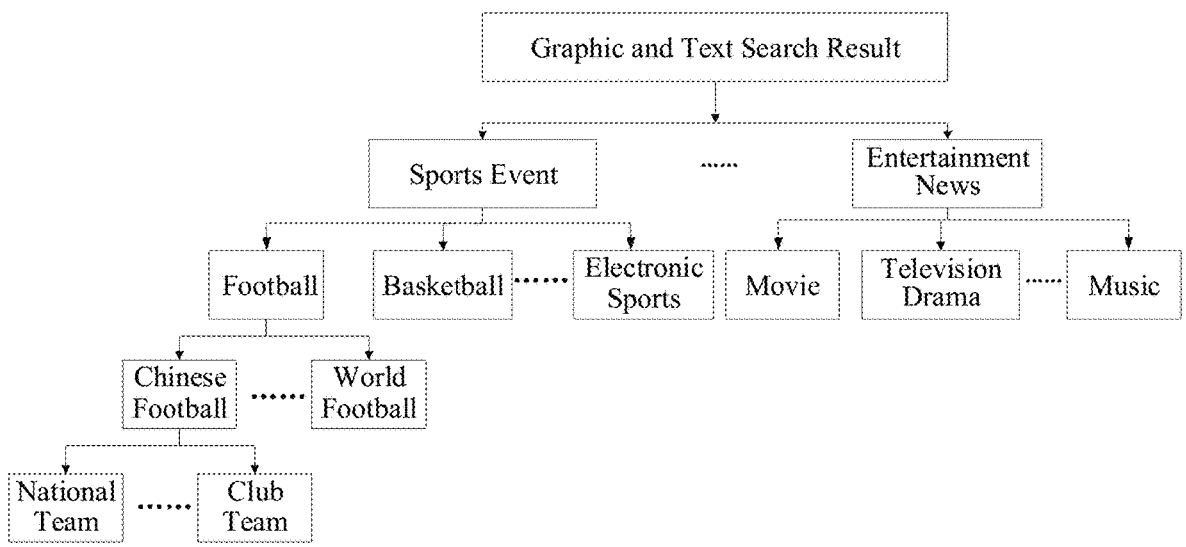
FIG. 3 is a schematic diagram of a search network according to the present application.

Referring to FIG. 3, which takes the graphic and text search result as an example. The graphic and text search result may serve as the root node, under which a first hierarchy of child nodes may include sports events, entertainment news, etc. Under the first hierarchy of child nodes, a second hierarchy of child nodes, a third hierarchy of child nodes, etc. are further included, until the leaf node is reached. In FIG. 3, only the sports events and the entertainment news are illustrated as examples, but the actual scenarios are not limited thereto.

Through the above solution, the search network can obtain multistage search results. On the one hand, the number of searches in the database is taken into account, and on the other hand, the search speed is improved by establishing different hierarchies using the levels of abstraction.

Figure 4:
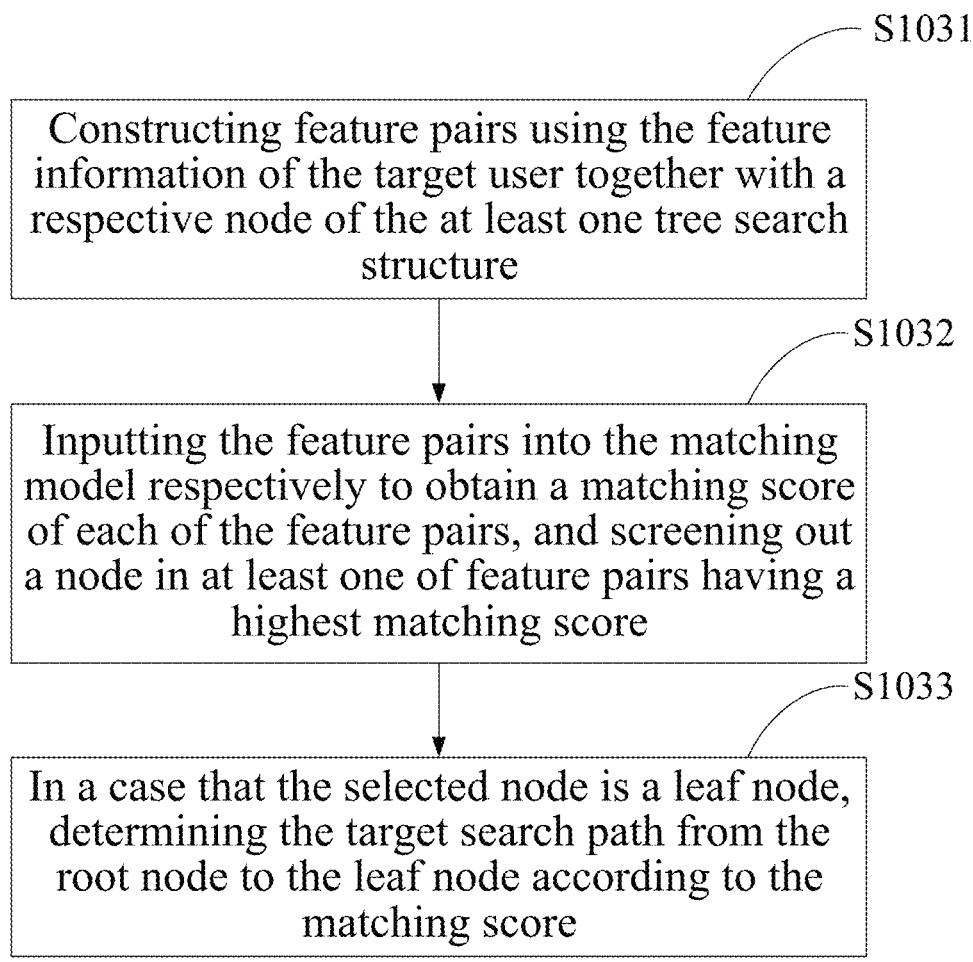
FIG. 4 is a flowchart of determination of a target search path according to the present application.

Referring to FIG. 4, in one embodiment, S103 may include:

S1031: constructing feature pairs using the feature information of the target user together with a respective node of the at least one tree search structure;

S1032: inputting the feature pairs into the matching model respectively to obtain a matching score of each of the feature pairs, and screening out a node in at least one of feature pairs having a highest matching score; and S1033: in a case that the selected node is a leaf node, determining the target search path from the root node to the node according to the matching score.

Referring to the schematic diagram of a candidate search result as shown in FIG. 3, for example, three root nodes are included, i.e., a graphic and text search result, a video search result and a short video search result. The matching scores of the three root nodes and the target user may be determined using the matching model. According to the ranking of the matching scores, N root nodes with the highest-ranking scores may be selected, where N is a positive integer, such as 1 or 2.

In a case where N is 1 and the root node with the highest score is the graphic and text search result, it is assumed that the search network is configured to continue the search only if the root node is the child node corresponding to the graphic and text search result. On this basis, the search content can be simplified.

Similarly, the matching model is adopted to determine the matching score of the target user and each of the child nodes when the root node is the graphic and text search result. The M child nodes with the highest scores may be selected. Here, the value of M may be determined according to the actual situation, for example, the value of M may be the same as that of N. In the embodiment as shown in FIG. 3, the child nodes include three hierarchies, and the matching score of each of the child nodes in the first hierarchy is determined firstly. For example, if one child node in the first hierarchy with the highest score is selected as the sports event, the subsequent search is only made for the child nodes in the second hierarchy under the sports event.

In FIG. 3, the leaf nodes such as the national team and the club team are finally obtained. The leaf nodes can be directly taken as the target search results.

In one embodiment, the child nodes may be set in three hierarchies. In this case, the tree search structure includes the root nodes and the leaf nodes, which are totally in five hierarchies. The search load can be decreased by filtering the search results in different hierarchies. Compared with the search load of a hundred thousand level in the database, the above solution can decrease the search load to a thousand level.

That is, through the above solution, in a case where a selected node is not a leaf node, feature pairs are formed by the feature information of the target user together with the child nodes of each node, respectively, and the step of inputting the matching model is repeatedly performed using the feature pairs; and in a case where a selected node is a leaf node, a target search path from the root node to the node is determined. Through the above solution, the matching model is adopted to score the nodes of the candidate search paths, so as to select the target search path. On this basis, the candidate search results may be filtered and the search load may be decreased.

Figure 5:
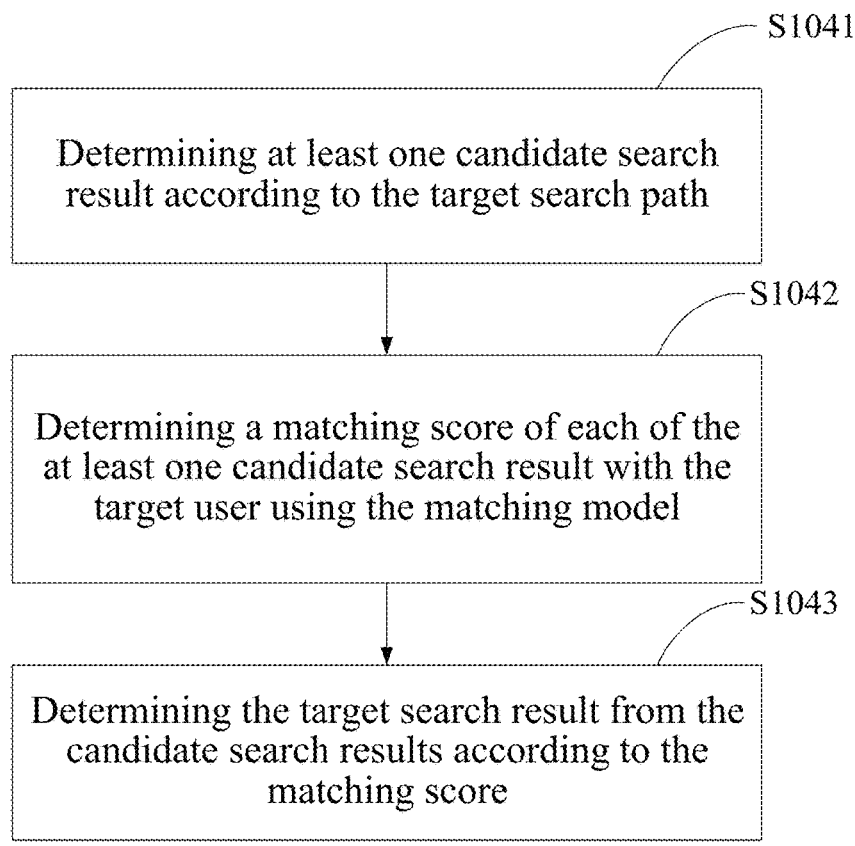
FIG. 5 is a flowchart of determination of a target search result according to the present application.

As shown in FIG. 5, in one embodiment, S104 may include:

S1041: determining at least one candidate search result according to the target search path;

S1042: determining a matching score of each of the at least one candidate search result with the target user using the matching model; and S1043: determining the target search result from the candidate search results according to the matching score.

After at least one candidate search result corresponding to the leaf nodes is obtained using the target search path, the matching score of each of the leaf nodes and the target user may be further determined using the matching model, thereby selecting S leaf nodes with the highest scores. The search results corresponding to the S leaf nodes are determined as the target search results.

Here, the value of S may be determined according to the actual situation, for example, S may be equal to N. S, N and M are all positive integers.

Through the above solution, the search results that best match the target user may be further selected in a case where a plurality of candidate search results are obtained.

In one embodiment, the matching model may include a first sub-model, a second sub-model and a third sub-model;

the first sub-model is configured to determine feature information corresponding to the node;

the second sub-model is configured to generate a predicted value of a degree of interest of the target user in the node according to the feature information corresponding to the node and the feature information of the target user; and the third sub-model is configured to obtain the matching degree according to the predicted value of the degree of interest.

Figure 6:
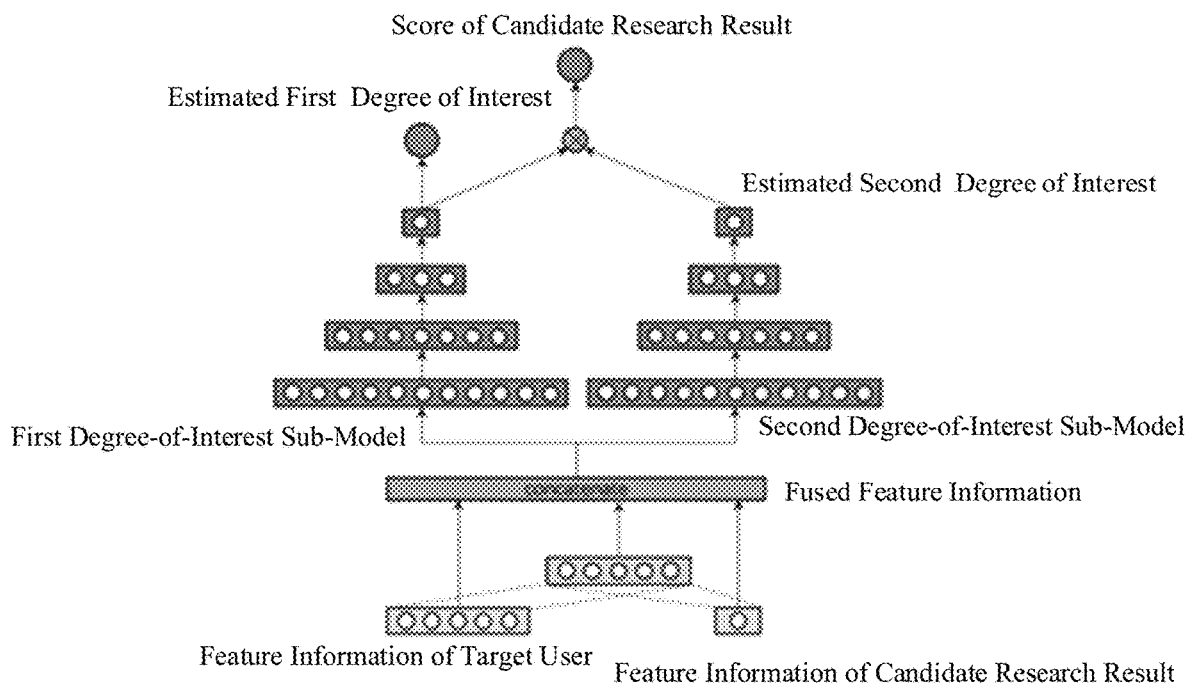
FIG. 6 is a schematic diagram of a matching model according to the present application.

As shown in FIG. 6, the first sub-model receives the nodes of the candidate search paths, determines the feature information of the nodes, and transmits the feature information of the nodes and the feature information of the target user to the second sub-model.

The second sub-model may include a feature fusion sub-model, a first degree-of-interest sub-model and a second degree-of-interest sub-model, wherein the feature fusion sub-model is configured to perform a fusion calculation for the feature information of the nodes and the feature of the target user. For example, the fusion calculation may be performed by calculating a sum or a Hadamard Product of the feature information, so as to obtain a fusion calculation result.

The fused feature information is input into the first degree-of-interest sub-model and the second degree-of-interest sub-model, respectively. The first degree-of-interest sub-model and the second degree-of-interest sub-model may be convolution neural network models, depth neural network models, etc. The fused feature information may include a fusion calculation result, the feature information of the nodes and the feature information of the target user.

In which, the first degree-of-interest sub-model may be a model for calculating a click-through rate, and an output result thereof is a predicted value of a first degree of interest. The second degree of interest model may be a model for calculating a viewing duration, and an output result thereof is a predicted value of a second degree of interest. That is, in this embodiment, the degree of interest is represented by the click-through rate and the viewing duration.

In addition, the degree-of-interest sub-model may also be extended. For example, a third degree-of-interest sub-model may be included, which may be a model for calculating a viewing proportion. For example, a movie lasts for 90 minutes, and the viewing proportion may be ½ when the movie is watched for 45 minutes. Or, a document has 9 pages, and the viewing proportion may be ⅓ when 3 pages are viewed.

The third sub-model perform a normalization calculation for the predicted value of the first degree of interest and the predicted value of the second degree of interest to obtain the score of the node. The score may indicate a matching degree between the node and the target user.

The matching model may be trained with feature information samples of the target user, feature information samples of each node, click-through rate tags and viewing duration tags, so that the trained matching model can realize a scoring function.

Through the above solution, the matching model trained based on the click-through rate and the viewing duration may get a more objective score.

In one embodiment, the degree of interest includes at least one of a click-through rate, a viewing duration, and a viewing proportion. Therefore, it is possible to obtain richer degree of interest indexes.

Figure 7:
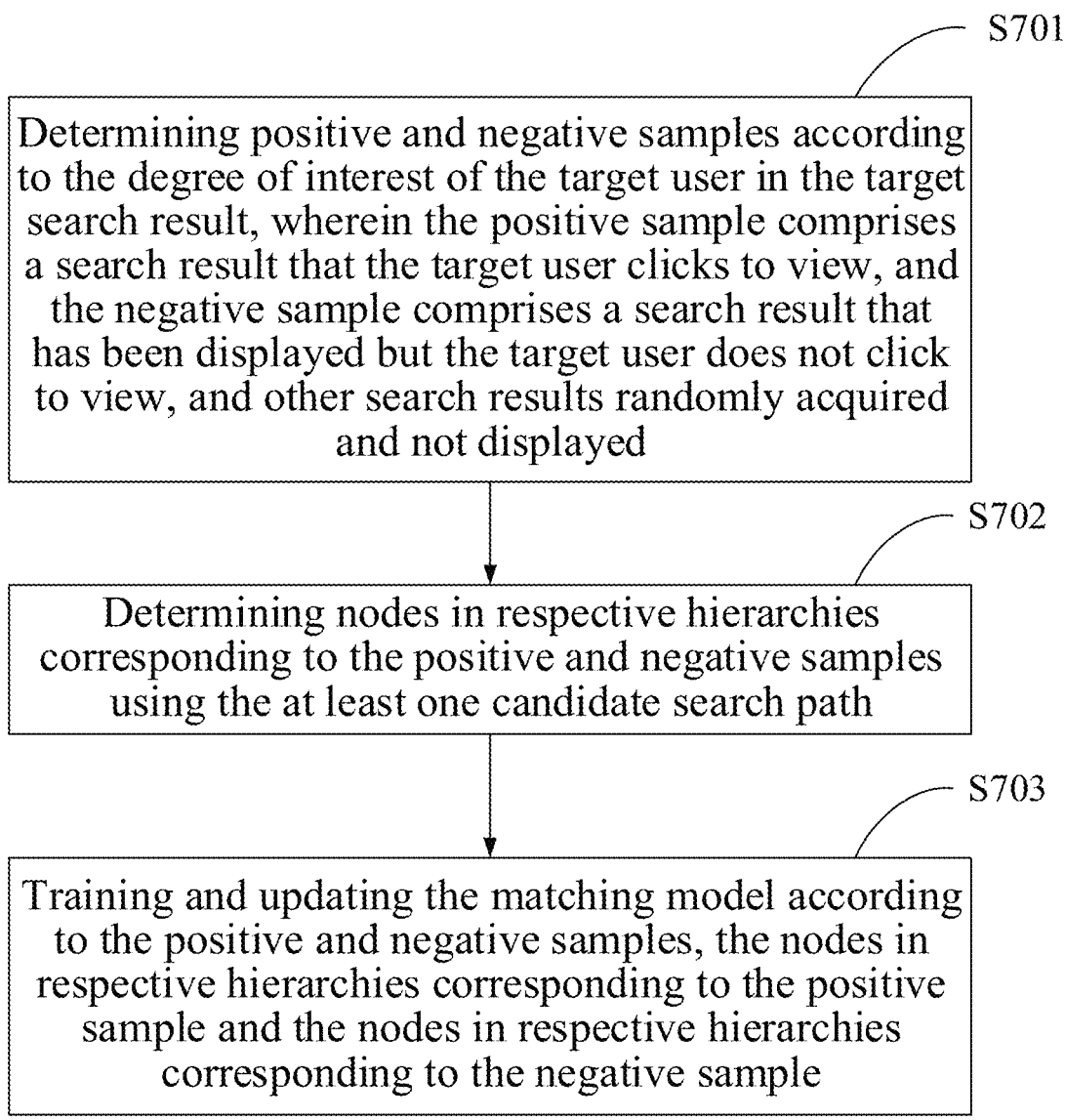
FIG. 7 is a flowchart of training and update of a matching model according to the present application.

As shown in FIG. 7, in one embodiment, the following steps may further be included:

S701: determining positive and negative samples according to the degree of interest of the target user in the target search result, wherein the positive sample includes a search result that the target user clicks to view, and the negative sample includes a search result that has been displayed but the target user does not click to view, and other search results randomly acquired and not displayed;

S702: determining nodes in respective hierarchies corresponding to the positive and negative samples using the at least one candidate search path; and S703: training and updating the matching model according to the positive and negative samples, the nodes in respective hierarchies corresponding to the positive sample and the nodes in respective hierarchies corresponding to the negative sample.

The target search results may be taken as the content finally displayed to the user on the present application interface. The degree of interest of the target user in a target search result may indicate whether to click the target search result, and the viewing duration or the viewing proportion of the clicked target search result.

Figure 8:
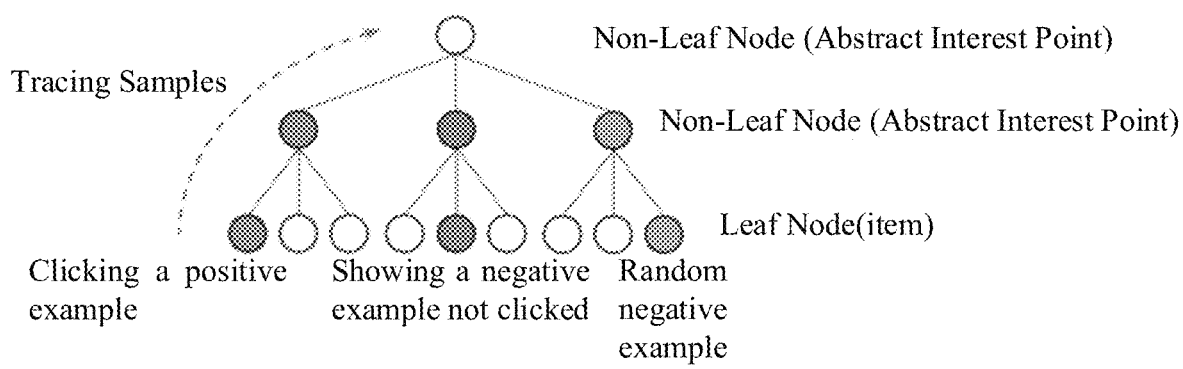
FIG. 8 is a schematic diagram of tracing of positive and negative samples according to the present application.

As shown in FIG. 8, the positive and negative samples may be determined from the degree of interest. The positive sample may include a target search result that a user clicks to view (corresponding to clicking a positive example in FIG. 8), while the negative sample may include a target search result that has been displayed but the user still does not click to view (corresponding to showing a negative example not clicked in FIG. 8), and any other search result randomly acquired and not displayed (corresponding to a random negative example in FIG. 8).

The positive and negative samples are traced in the search network to obtain a plurality of hierarchies of candidate search results related thereto.

The matching model is trained with the positive and negative samples and the plurality of hierarchies of candidate search results related thereto, so as to achieve the continuous update of the matching model.

The updated matching model may be delivered to the online search service in an hourly granularity.

Through the above solution, tracing nodes of the positive and negative samples can be obtained using the search network, so as to train and update the matching model using the positive and negative samples and corresponding tracing nodes, thereby optimizing the matching model.

Figure 9:
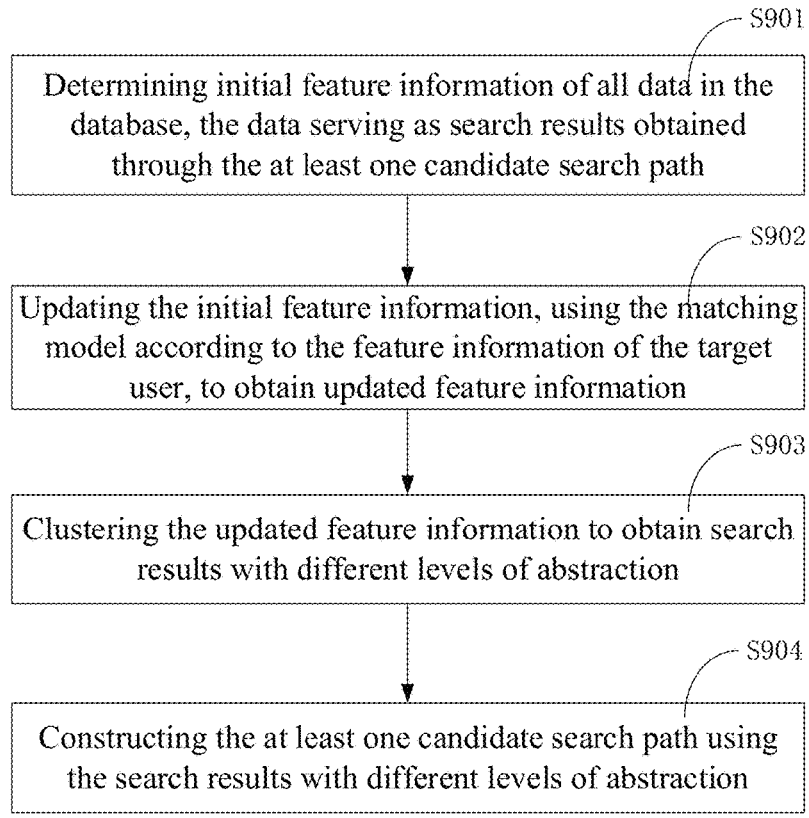
FIG. 9 is a flowchart of construction of a search network according to the present application.

As shown in FIG. 9, a construction way of the at least one candidate search path may include:

S901: determining initial feature information of all data in the database, the data serving as search results obtained through the at least one candidate search path;

S902: updating the initial feature information using the matching model according to the feature information of the target user, to obtain updated feature information;

S903: clustering the updated feature information to obtain search results with different levels of abstraction; and S904: constructing the at least one candidate search path using the search results with different levels of abstraction.

All the data in the database may be a multimedia file updated in real time, for example including a graphic and text file, a video file and a short video file. The initial feature information of all the data is determined, which may be analyzed from the content of the multimedia file, a file producer, a file cover or a file label.

The feature information of the target user and the initial feature information is input into the matching model, and the initial feature information is updated using the matching model by correlating the two types of feature information, so as to obtain the updated feature information.

The updated feature information is clustered, for example using a k-means clustering algorithm, so as to obtain a plurality of hierarchies of data with different levels of abstraction, which is the aforementioned plurality of hierarchies of search results with different levels of abstraction. According to the plurality of hierarchies of data with different levels of abstraction, the tree search structure for example as shown in FIG. 2 or FIG. 3 may be obtained.

Through the above solution, each of the candidate search results may be associated with the target user, and the candidate search results may be clustered to obtain a plurality of hierarchies of candidate search results with different levels of abstraction. Therefore, during the search, a good generalization effect can be achieved, and the search speed can also be ensured.

In one embodiment, the target search result is recommended to the target user.

The above method according to the present application may be applied to a personalized recommendation system, which requires recalling thousands of pieces of preferred contents of the target user from a database of a million-magnitude within about 500 milliseconds, and then selecting about ten pieces of contents to be recommended to the user by means of ranking and/or strategy adjustment.

The related art adopts a double-tower structure to obtain the recommended contents. Based on the content clicked by the user, a vector nearest neighbor metric search is performed to select the recommendation results. For example, if the user clicks the football highlights of Team A, the personalized recommendation system adopts the double-tower structure to perform a vector nearest neighbor metric search in the database, and determines any other video, graph and text having a highest correlation with the football highlights of Team A, and recommends them to the user. Although information recommendation can be achieved, it is difficult to express the nonlinear relationship between the user and the content feature and there is an excessive dependence on fitting, which limits the recommendation effect.

When the above method is adopted for the personalized recommendation, the user features include many factors such as gender, age, historical data, etc., wherein the historical data not only indicates whether the user clicks a recommended content, but also reflects the user's preference degree for the clicked recommended content through the viewing duration or the viewing proportion of the recommended content. The user features are combined with each content to be recommended for joint learning of the matching model, so that the trained matching model can match and score new contents, and then determine the recommended contents according to the scoring results. In addition, since being existed in the form of root nodes, child nodes and leaf nodes, the candidate search paths can be filtered using the matching model.

After the target search results, i.e., the recommended contents, are obtained, they may be ranked according to the update time of the recommended contents, the popularity of watching or the strategy of scoring with the matching model again, etc., and several search results ranked first are selected and recommended to the user.

Based on the above solution of the present application, on the one hand, the balance between quantity and speed may be achieved when the candidate search paths are filtered. That is, the generalization of the recommended results is ensured since all the recommended contents in the database can be obtained through the search paths. Meanwhile, the search paths may be filtered from the root nodes to the child nodes until the leaf nodes based on the matching model, so that the recommendation results with a low matching degree can be filtered out, thereby increasing the recommendation speed and meeting the requirement of 500 milliseconds.

More importantly, the nodes in each hierarchy establish a correspondence relationship with the user feature through the matching model, so that correlations between the recommendation results and the user's historical behaviors can be weakened relatively, i.e., reducing the risk of poor recommendation effect due to the excessive dependence on the user's historical behaviors for fitting caused by the vector nearest neighbor metric search. By matching the candidate search paths with the matching model to recommend information, the emphasis on the historical correlation is reduced, and instead, the user's personal information, the user's click-through rate of the content and the user's degree of interest are taken into account, thereby bringing about significant increases in the product experience and the scale indexes of the personalized recommendation system.

Figure 10:
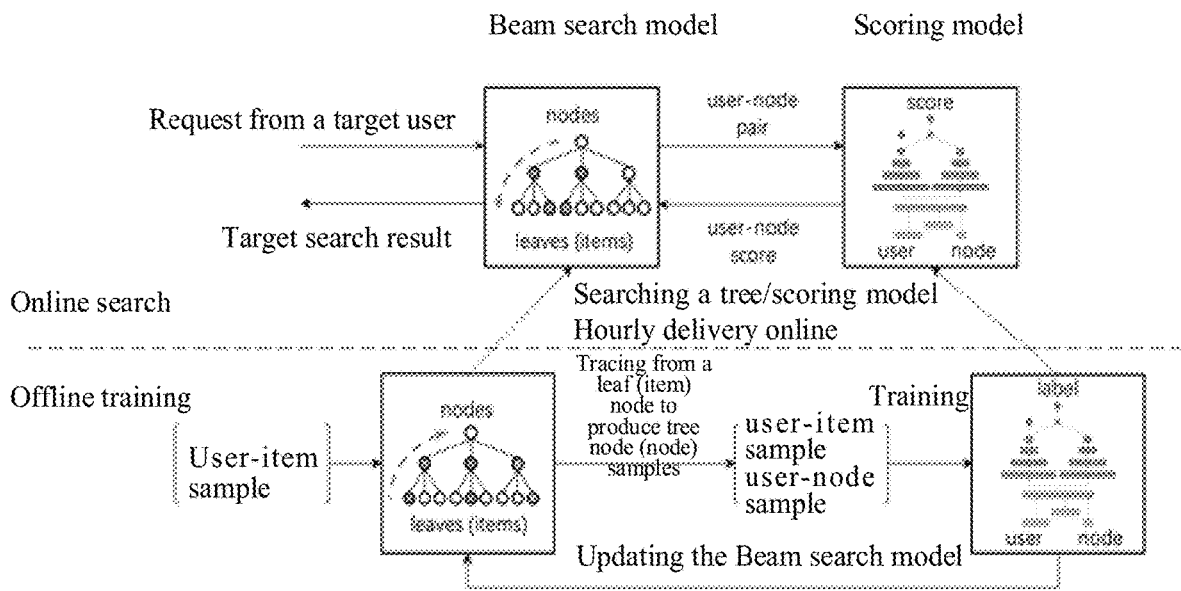
FIG. 10 is a diagram of a scene for implementing an information search method according to an embodiment of the present application.

As shown in FIG. 10, the present application provides an information search method, including the steps of:

determining feature information of a target user according to a request from the target user. The request from the target user may be the user's login to an APP, or the user's display refresh instruction, etc.

The feature information of the target user is input into a Beam search model to obtain the feature information of the target user and matching pairs (user-node pairs) of child nodes in a first hierarchy. In FIG. 10, a leaf node is denoted as an item, and a non-leaf node is denoted as a node.

The matching model scores the child nodes in the first hierarchy according to the matching pairs, and M child nodes in the first hierarchy with the highest scores are reserved.

A Beam search network performs a downward search for the M child nodes with the highest scores, and obtains the feature information of the target user and matching pairs of child nodes in a second hierarchy of the M child nodes in the first hierarchy. The matching model continues to score the matching pairs, until S leaf nodes with the highest scores are determined. The S leaf nodes with the highest scores are taken as the target search results and displayed to the target user.

At the same time, matching pairs (user-item samples) of feature information samples of the target user and target search result samples are determined according to the historical data of the target user. The matching pairs of the feature information samples of the target user and the target search result samples are transmitted to the search network, and traced therein to obtain a plurality of hierarchies of candidate search results related to the target search result samples. On this basis, matching pairs (user-node samples) of the feature information samples of the target user and the plurality of hierarchies of candidate search results can be determined. The matching model is trained with the matching pairs of the feature information samples of the target user and the target search result samples, as well as the matching pairs of the feature information samples of the target user and the plurality of hierarchies of candidate search results.

In addition, for the updated multimedia file in the database, the matching model may be adopted for associated learning of the multimedia file and the target user. After the associated learning, the feature information of the multimedia file may be updated and clustered to construct the Beam search network, or update the existing Beam search network.

The updated Beam search network and the matching model may be deployed online at hourly intervals.

Figure 11:
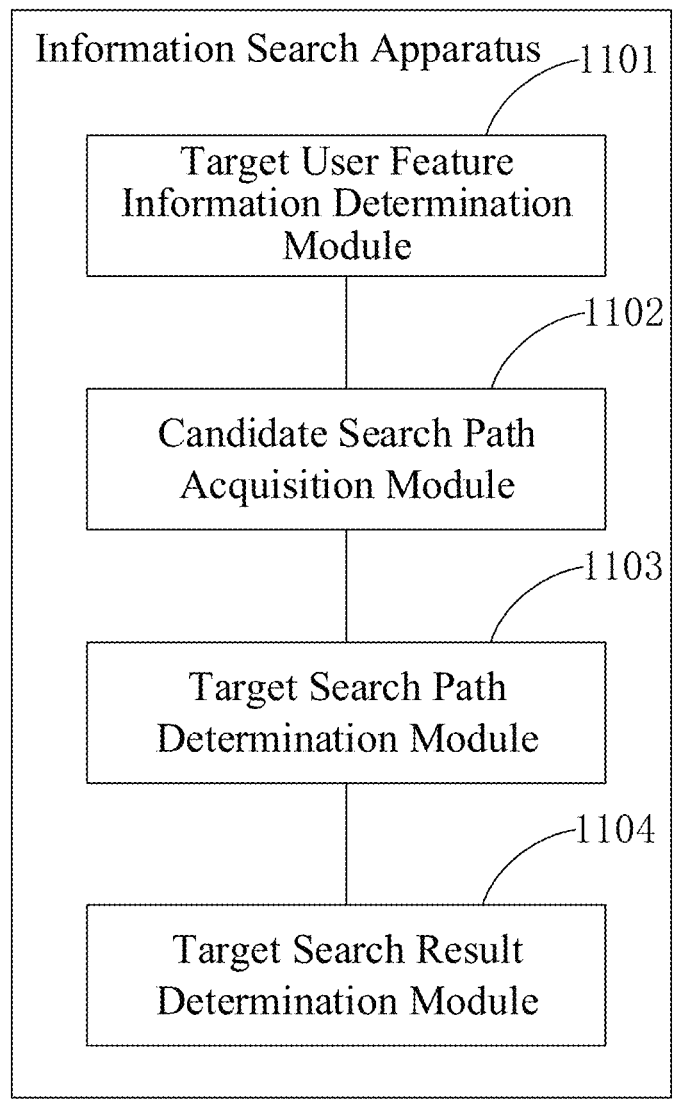
FIG. 11 is a schematic diagram of an information search apparatus according to the present application.

As shown in FIG. 11, in one embodiment, the present application provides an information search apparatus, which may include:

a target user feature information determination module 1101 configured to determine feature information of a target user;

a candidate search paths acquisition module 1102 configured to acquire at least one candidate search path to determine candidate search results in a database;

a target search path determination module 1103 configured to determine a matching degree between the feature information of the target user and the at least one candidate search path using a matching model, and determine a target search path from the at least one candidate search path according to the matching degree; and a target search result determination module 1104 configured to determine a target search result matched with the target user using the target search path.

In one embodiment, the at least one candidate search path forms at least one tree search structure, each of the at least one tree search structure includes a plurality of nodes;

each of the at least one candidate search path includes a path from a root node to a leaf node in the tree search structure.

In one embodiment, the target search path determination module 1103 includes:

a feature pair construction submodule configured to construct feature pairs using the feature information of the target user together with a respective node of the at least one tree search structure;

a node filtering submodule configured to input the feature pairs into the matching model respectively to obtain a matching score of each of the feature pairs, and screen out a node in at least one of feature pairs having a highest matching score; and a target search path determination execution submodule configured to, in a case that the selected node is a leaf node, determine the target search path from the root node to the node according to the matching score.

In one embodiment, the target search result determination module 1104 includes:

a candidate search result determination submodule configured to determine at least one candidate search result according to the target search path;

a matching score determination submodule configured to determine a matching score of each of the at least one candidate search result with the target user using the matching model; and a target search result determination execution submodule configured to determine the target search result from the candidate search results according to the matching score.

In one embodiment, the matching model includes a first sub-model, a second sub-model and a third sub-model;

the first sub-model is configured to determine feature information corresponding to the node;

the second sub-model is configured to generate a predicted value of a degree of interest of the target user in the node according to the feature information corresponding to the node and the feature information of the target user; and the third sub-model is configured to obtain the matching degree according to the predicted value of the degree of interest.

In one embodiment, the degree of interest includes at least one of a click-through rate, a viewing duration and a viewing proportion.

In one embodiment, the apparatus further includes:

a sample determination module configured to determine positive and negative samples according to the degree of interest of the target user in the target search result, wherein the positive sample includes a search result that the target user clicks to view, and the negative sample includes a search result that has been displayed but the target user does not click to view, and other search results randomly acquired and not displayed;

a sample tracing module configured to determine nodes in respective hierarchies corresponding to the positive and negative samples using the at least one candidate search path; and a matching model update module configured to train and update the matching model according to the positive and negative samples, the nodes in respective hierarchies corresponding to the positive sample and the nodes in respective hierarchies corresponding to the negative sample.

In one embodiment, the apparatus further includes:

a data initial feature information determination module configured to determine initial feature information of all data in the database, the data serving as search results obtained through the at least one candidate search path;

a feature information update module configured to update the initial feature information, using the matching model according to the feature information of the target user, to obtain updated feature information;

a clustering module configured to cluster the updated feature information to obtain search results with different levels of abstraction; and a search network construction module configured to construct the at least one candidate search path using the search results with different levels of abstraction.

In one embodiment, the target search result is recommended to the target user.

According to the embodiments of the present application, the present application further provides an electronic device and a readable storage medium.

Figure 12:
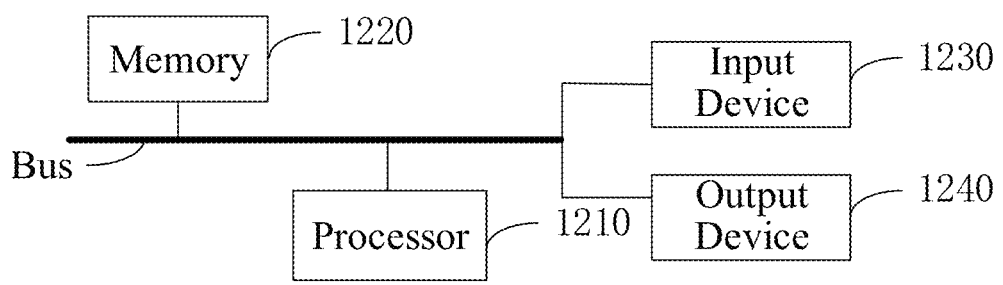
FIG. 12 is a block diagram of an electronic device for implementing an information search method according to an embodiment of the present application.

FIG. 12 is a block diagram of an electronic device for implementing an information search method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present application described and/or claimed herein.

As shown in FIG. 12, the electronic device includes one or more processors 1210, a memory 1220, and interfaces for connecting the respective components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 121 is shown in FIG. 12.

The memory 1220 is a non-transitory computer-readable storage medium provided by the present application. The memory stores instructions executable by at least one processor to enable the at least one processor to implement the information search method provided by the present application. The non-transitory computer-readable storage medium of the present application stores computer instructions for enabling a computer to implement the information search method provided by the present application.

As a non-transitory computer-readable storage medium, the memory 1220 may be configured to store non-transitory software programs, non-transitory computer-executable programs, and modules, such as program instructions/modules corresponding to the information search method in the embodiments of the present application (e.g., the target user feature information determination module 1101, the candidate search paths acquisition module 1102, the target search path determination module 1103, and the target search result determination module 1104 as shown in FIG. 11). The processor 1210 executes various functional applications and data processing of the electronic device by running the non-transitory software programs, instructions and modules stored in the memory 1220, thereby implementing the information search method in the above method embodiments.

The memory 1220 may include a program storage area and a data storage area, wherein the program storage area may store an operating system, and an application program required for at least one function; and the data storage area may store data created according to the use of the electronic device for implementing the information search method. In addition, the memory 1220 may include a high speed random access memory, and may also include a non-transitory memory, such as at least one disk storage device, a flash memory device, or other non-transitory solid state memory device. In some embodiments, the memory 1220 optionally includes memories remotely located relative to the processor 1210, which may be connected, via a network, to the electronic device for implementing the information search method. Examples of such networks may include, but are not limited to, the Internet, an intranet, a local area network, a mobile communication network and combinations thereof.

The electronic device for implementing the scheduling method may further include an input device 1230 and output device 1240. The processor 1210, the memory 1220, the input device 1230, and the output device 1240 may be connected by buses or in other ways, and the bus connection is taken as an example in FIG. 12.

The input device 1230 may receive input numeric or character information, and generate a key signal input related to a user setting and a functional control of the electronic device for implementing the information search method. For example, the input device may be a touch screen, a keypad, a mouse, a track pad, a touch pad, a pointer stick, one or more mouse buttons, a track ball, a joystick, and other input devices. The output device 1240 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS).

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

The invention claimed is:

1. An information search method, comprising:
    determining feature information of a target user;
    acquiring at least one candidate search path to determine candidate search results in a database;
    determining a matching degree between the feature information of the target user and the at least one candidate search path using a matching model, and determining a target search path from the at least one candidate search path according to the matching degree; and
    determining a target search result matched with the target user using the target search path;
    wherein a construction way of the at least one candidate search path comprises:
    determining initial feature information of all data in the database, the data serving as search results obtained through the at least one candidate search path;
    updating the initial feature information, using the matching model according to the feature information of the target user, to obtain updated feature information;
    clustering the updated feature information to obtain search results with different levels of abstraction; and
    constructing the at least one candidate search path using the search results with different levels of abstraction.

2. The method according to claim 1, wherein the at least one candidate search path forms at least one tree search structure, each of the at least one tree search structure comprises a plurality of nodes;
   each of the at least one candidate search path comprises a path from a root node to a leaf node in the tree search structure.

3. The method according to claim 2, wherein the determining the matching degree between the feature information of the target user and the at least one candidate search path using the matching model, and determining the target search path from the at least one candidate search path according to the matching degree, comprises:
   constructing feature pairs using the feature information of the target user together with a respective node of the at least one tree search structure;
   inputting the feature pairs into the matching model respectively to obtain a matching score of each of the feature pairs, and screening out a node in at least one of feature pairs having a highest matching score; and
   in a case that the selected node is the leaf node, determining the target search path from the root node to the node according to the matching score.

4. The method according to claim 3, wherein the determining the target search result matched with the target user using the target search path, comprises:
   determining at least one candidate search result according to the target search path;
   determining a matching score of each of the at least one candidate search result with the target user using the matching model; and
   determining the target search result from the candidate search results according to the matching score.

5. The method according to claim 2, wherein the matching model comprises a first sub-model, a second sub-model and a third sub-model;
   the first sub-model is configured to determine feature information corresponding to the node;
   the second sub-model is configured to generate a predicted value of a degree of interest of the target user in the node according to the feature information corresponding to the node and the feature information of the target user; and
   the third sub-model is configured to obtain the matching degree according to the predicted value of the degree of interest.

6. The method according to claim 5, wherein the degree of interest comprises at least one of a click-through rate, a viewing duration, and a viewing proportion.

7. The method according to claim 2, further comprising:
   determining positive and negative samples according to the degree of interest of the target user in the target search result, wherein the positive sample comprises a search result that the target user clicks to view, and the negative sample comprises a search result that has been displayed but the target user does not click to view, and other search results randomly acquired and not displayed;
   determining nodes in respective hierarchies corresponding to the positive and negative samples using the at least one candidate search path; and
   training and updating the matching model according to the positive and negative samples, the nodes in respective hierarchies corresponding to the positive sample and the nodes in respective hierarchies corresponding to the negative sample.

8. The method according to claim 1, wherein the target search result is recommended to the target user.

9. An information search apparatus, comprising:
   a processor and a memory for storing one or more computer programs executable by the processor,
   wherein when executing at least one of the computer programs, the processor is configured to:
   determine feature information of a target user;
   acquire at least one candidate search path to determine candidate search results in a database;
   determine a matching degree between the feature information of the target user and the at least one candidate search path using a matching model, and determine a target search path from the at least one candidate search path according to the matching degree; and
   determine a target search result matched with the target user using the target search path;
   wherein, when executing at least one of the computer programs, the processor is further configured to:
   determine initial feature information of all data in the database, the data serving as search results obtained through the at least one candidate search path;
   update the initial feature information, using the matching model according to the feature information of the target user, to obtain updated feature information;
   cluster the updated feature information to obtain search results with different levels of abstraction; and
   construct the at least one candidate search path using the search results with different levels of abstraction.

10. The apparatus according to claim 9, wherein the at least one candidate search path forms at least one tree search structure, each of the at least one tree search structure comprises a plurality of nodes;
    each of the at least one candidate search path comprises a path from a root node to a leaf node in the tree search structure.

11. The apparatus according to claim 10, wherein, when executing at least one of the computer programs, the processor is further configured to:
    construct feature pairs using the feature information of the target user together with a respective node of the at least one tree search structure;
    input the feature pairs into the matching model respectively to obtain a matching score of each of the feature pairs, and screening out a node in at least one of feature pairs having a highest matching score; and
    in a case that the selected node is the leaf node, determine the target search path from the root node to the node according to the matching score.

12. The apparatus according to claim 11, wherein, when executing at least one of the computer programs, the processor is further configured to:
    determine at least one candidate search result according to the target search path;
    determine a matching score of each of the at least one candidate search result with the target user using the matching model; and
    determine the target search result from the candidate search results according to the matching score.

13. The apparatus according to claim 10, wherein, when executing at least one of the computer programs, the processor is further configured to:
    determine feature information corresponding to the node;
    generate a predicted value of a degree of interest of the target user in the node according to the feature information corresponding to the node and the feature information of the target user; and obtain the matching degree according to the predicted value of the degree of interest.

14. The apparatus according to claim 13, wherein the degree of interest comprises at least one of a click-through rate, a viewing duration, and a viewing proportion.

15. The apparatus according to claim 10, wherein, when executing at least one of the computer programs, the processor is further configured to:
   determine positive and negative samples according to the degree of interest of the target user in the target search result, wherein the positive sample comprises a search result that the target user clicks to view, and the negative sample comprises a search result that has been displayed but the target user does not click to view, and other search results randomly acquired and not displayed;
   determine nodes in respective hierarchies corresponding to the positive and negative samples using the at least one candidate search path; and
   train and update the matching model according to the positive and negative samples, the nodes in respective hierarchies corresponding to the positive sample and the nodes in respective hierarchies corresponding to the negative sample.

16. The apparatus according to claim 9, wherein the target search result is recommended to the target user.

17. A non-transitory computer-readable storage medium storing computer instructions, wherein the computer instructions cause a computer to execute the method according to claim 1.

18. A non-transitory computer-readable storage medium storing computer instructions, wherein the computer instructions cause a computer to execute the method according to claim 2.

* * * * *